United States Patent [19]
Ito et al.

[11] Patent Number: 5,205,254
[45] Date of Patent: Apr. 27, 1993

[54] AIR FUEL INJECTOR AND CONTROL

[75] Inventors: Takeshi Ito; Yoshihiko Moriya, both of Shizuoka, Japan

[73] Assignee: Yamaha Hatsudoki Kabushiki Kaisha, Iwata, Japan

[21] Appl. No.: 805,318

[22] Filed: Dec. 10, 1991

[30] Foreign Application Priority Data
Dec. 14, 1990 [JP] Japan ................................ 2-410975

[51] Int. Cl.$^5$ ..................... F02M 67/00; F02B 17/00
[52] U.S. Cl. ................. 123/305; 123/73.006; 123/531
[58] Field of Search ...... 123/73 C, 305, 531, 123/533, 295

[56] References Cited
U.S. PATENT DOCUMENTS

| | | | |
|---|---|---|---|
| 5,020,504 | 6/1991 | Morikawa | 123/305 X |
| 5,105,792 | 4/1992 | Ichikawa et al. | 123/533 X |

Primary Examiner—Tony M. Argenbright
Attorney, Agent, or Firm—Ernest A. Beutler

[57] ABSTRACT

A fuel/air injector for a crankcase compression two-cycle internal combustion engine and control strategy therefore wherein under a first load range of the engine which is generally a low speed, low load range, fuel is supplied to the fuel/air injector at a time which does not precede the opening of the injector valve and then as the load and speed of the engine increase, the timing of opening of the injector valve is advanced until a certain condition is reached and thereafter the opening of the injector valve is held constant and the timing of fuel supply is advanced so that fuel supply precedes the opening of the injector valve.

37 Claims, 7 Drawing Sheets

AIR FUEL INJECTOR AND CONTROL

BACKGROUND OF THE INVENTION

This invention relates to an air/fuel injector and control for an internal combustion engine.

In order to improve the performance of an internal combustion engine and particularly its fuel economy and exhaust emission control, it has been proposed to employ direct cylinder fuel injection. It has further been proposed to improve the atomization or disbursement of the fuel supply to the combustion chamber by the injector by also injecting high pressure air along with the fuel. The types of fuel air injectors which have been proposed employ a chamber or a plurality of chambers to which air and fuel are supplied under pressure and which are delivered to the combustion chamber when the injector valve is opened. In one form of control strategy, the fuel is all supplied to its respective chamber before the injector valve is opened. In another form of strategy, the fuel is supplied to the chamber during the time when the injector valve is opened. These types of charging strategies, however, present certain difficulties.

With the precharged type of injector, not all of the fuel may be discharged from its chamber when the injector valve is opened. This results in poor combustion and uneven combustion. The non-precharged type of fuel/air injector, on the other hand, does not present this problem but with this type of injector as well as the precharged type, it may be difficult to supply all of the required fuel to the combustion chamber without other problems.

For example, when running at high speed and high load conditions, a substantial amount of fuel is required. If this fuel must all be charged into the chamber of the fuel injector and then into the combustion chamber during the time when the injector valve is opened, it may not be possible to supply sufficient fuel or, alternatively, the amount of fuel supplied may be so great that full evacuation of the injector chamber and disbursement of the fuel is not possible. In addition, the duration of opening of the injector valve becomes so great that bouncing of the valve can be a problem.

A bouncing condition results when the injector valve is closed. The rapid closure of the injector valve tends to cause the valve to again bounce open until its motion is fully dampened and thus additional fuel may be delivered to the combustion chamber of the engine after the valve is closed. When this occurs, the fuel may actually be delivered at the time the spark plug is fired and this can give rise to misfiring, pre-ignition and other problems.

The problems aforedescribed are particularly acute in conjunction with two cycle crankcase compression engines. With such engines, as is well known, there is a substantial overlap between the closing of the exhaust port and the opening of the scavenge port and if the duration of fuel injection is too long, fuel may be discharged directly out of the exhaust port resulting in poor fuel economy and high exhaust gas emissions, particularly with unburned hydrocarbons.

It is, therefore, a principal object of this invention to provide an improved fuel injector and control for an internal combustion engine wherein adequate amounts of fuel can be delivered to the combustion chamber and fully disbursed without the fear of unburned fuel being discharged from the exhaust port of the engine. It is a further object of this invention to provide an improved air/fuel injector and control therefore wherein adequate amounts of fuel can be supplied to the engine under all running conditions without causing pre-ignition or other combustion difficulties.

It is a further object of this invention to provide an air/fuel injector and control for an engine wherein the dynamic range of operation of the fuel injector and the operation through this range is significantly improved.

SUMMARY OF THE INVENTION

This invention is adapted to be embodied in a fuel/air injector unit and control therefore wherein the injector unit comprises an outer housing assembly that defines chamber means. Air means supply air under pressure to the chamber means and fuel means supply fuel to the chamber means. An injector port communicates the chamber means with an engine chamber and an injector valve opens and closes the injector port. Means are provided for selectively opening and closing the injector port and control means control the initiation of fuel delivery by the fuel means and the means for operating the injector valve.

In a fuel/air injector constructed in accordance with an embodiment of the invention the control means initiates fuel delivery by the fuel means to the chamber means beginning at a time before the injector valve is opened and terminating after the time the injector valve is opened under at least one running condition of the engine.

In accordance with a method of operating a fuel injector unit as described, the fuel means is operated to initiate the supply of fuel to the chamber means before the injector valve is opened and fuel supply is terminated at a time after the injector valve is opened under at least one running condition of the engine.

DETAILED DESCRIPTION OF THE PREFERRED EMBODIMENTS OF THE INVENTION

Figure 1:
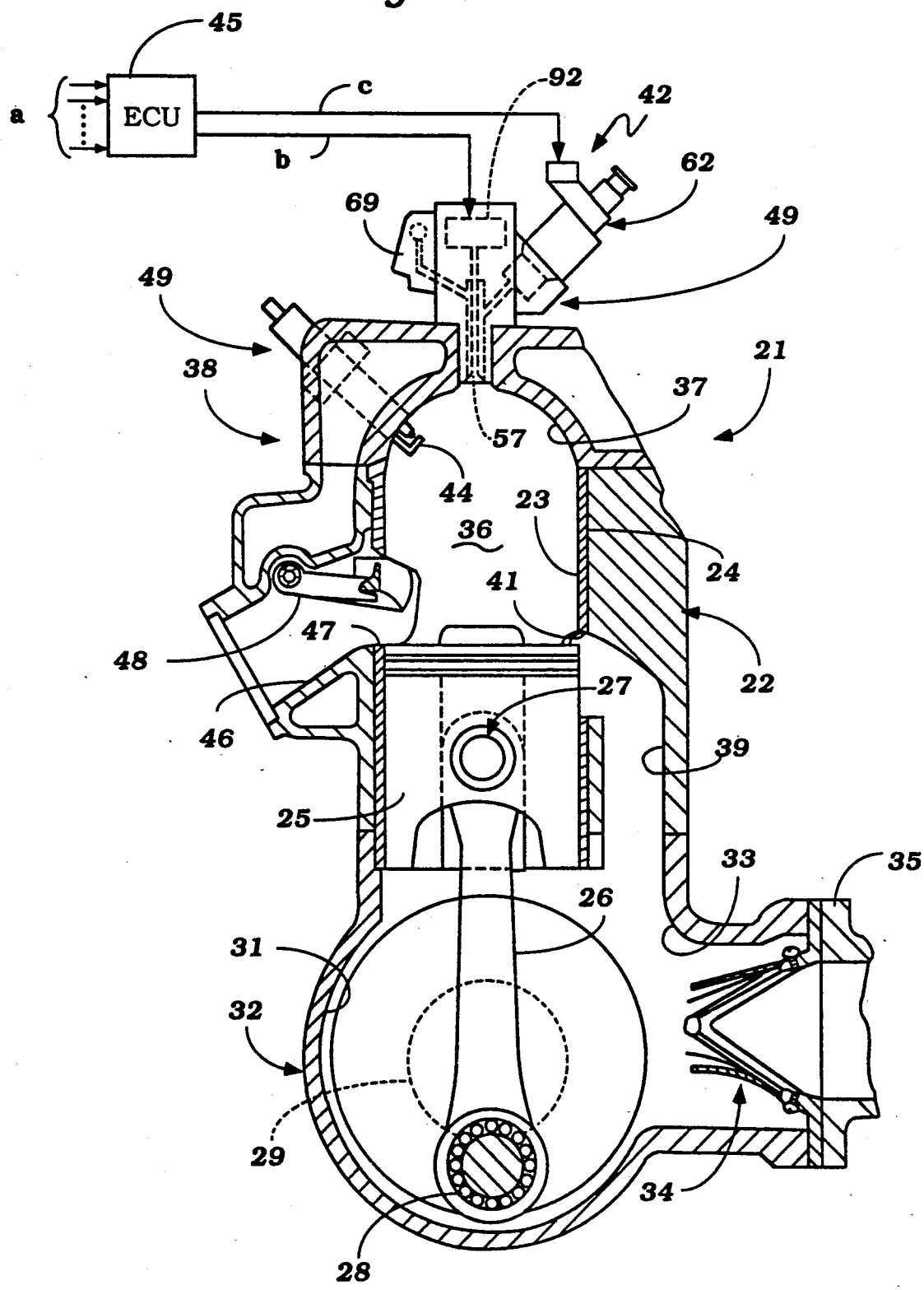
FIG. 1 is a cross sectional view taken through a single cylinder of a multiple cylinder internal combustion engine constructed in accordance with an embodiment of the invention.

Referring first to FIG. 1, a two-cycle crankcase compression internal combustion engine constructed and operated in accordance with an embodiment of the invention is identified generally by the reference numeral 21. FIG. 1 is a cross sectional view taken through a single cylinder of a multiple cylinder engine. It is believed that those skilled in the art can readily understand how the invention is practiced with multiple cylinder engines by a description of a single cylinder of the engine. Also, the invention is described in conjunction with a reciprocating type of engine, it should be understood that the invention may be practiced with other types of engines such as rotary engines. Furthermore, although the invention has particular utility in two-cycle engines, it may also be employed in four-cycle engines. Because of the port timing overlap with two-cycle engines, however, the invention has greater utility in such engines.

The engine 21 is comprised of a cylinder block 22 in which a cylinder bore 23 is formed by a liner 24. A piston 25 reciprocates within the cylinder bore 23 and is connected to the upper or small end of a connecting rod 26 by means of a piston pin 27. The lower end of the connecting rod 26 is journaled on a throw 28 of a crankshaft 29. The crankshaft 29 is rotatably journaled, in a suitable manner, in a crankcase chamber 31 formed by the lower portion of the cylinder block 22 and a crankcase member 32 that is affixed to the cylinder block 22 in a known manner. As is typical in two-cycle engine practice, the crankcase chamber 31 associated with each piston 25 of the engine is sealed suitably from the other crankcase chambers of the engine.

An intake charge, which may be either pure air or an air/fuel charge, under some circumstances as will be described, is delivered to the crankcase chamber 31 through an intake port 33. A reed type check valve 34 is positioned in the intake port 33 for precluding reverse flow when the piston 25 moves downwardly to compress the charge in the crankcase chamber 31. An air manifold 35 which incorporates an air inlet and silencing device and throttle valve (not shown) communicates with the intake ports 33.

A combustion chamber 36 is formed above the head of the piston 25 by the piston head, cylinder bore 23 and a cavity 37 of a cylinder head assembly 38. The cylinder head assembly 38 is affixed to the cylinder block 22 in a known manner.

The charge which has been compressed within the crankcase chamber 31 during downward movement of the piston 25 is transferred to the combustion chamber 36 through a plurality of scavenge passages 39 which are formed in the cylinder block 22 and which extend from the crankcase chamber 31 to scavenged port openings 41 formed in the cylinder liner 24. This charge is then further compressed in the combustion chamber 36 as the piston 25 moves upwardly.

A fuel/air charge is sprayed into the combustion chamber 36 by a fuel/air injector assembly, indicated generally by the reference numeral 42 and the construction of which will be described in more detail later by reference to FIG. 2. This fuel/air charge is then fired by means of a spark plug 43 that has its spark gap 44 disposed within the combustion chamber 36. The fuel/air injector 42 and spark plug 43 are controlled by an ECU 45 in accordance with a strategy which will be described. The ECU 45 receives input signals a indicative of varying engine conditions such as air flow through the induction system, pressure in the crankcase chamber 31, engine temperature, throttle valve opening, and any of a variety of other factors including ambient conditions.

The charge which has been fired in the combustion chamber 36 will expand and drive the piston 25 downwardly. The burnt charge is then exhausted through an exhaust passage 46 formed in the cylinder block 22 and which extends from an exhaust port 47 that is formed in confronting relationship to at least one of the scavenge passages 39. An exhaust manifold (not shown) receives exhaust gases from the exhaust ports 46 and delivers them to the atmosphere. If desired, an exhaust control valve 48 may be positioned in the exhaust port 47 for controlling either the timing of the opening of the exhaust port 47 and/or the compression ratio. The exhaust control valve 48 may also be controlled by the ECU 45 in accordance with any desired strategy.

Figure 2:
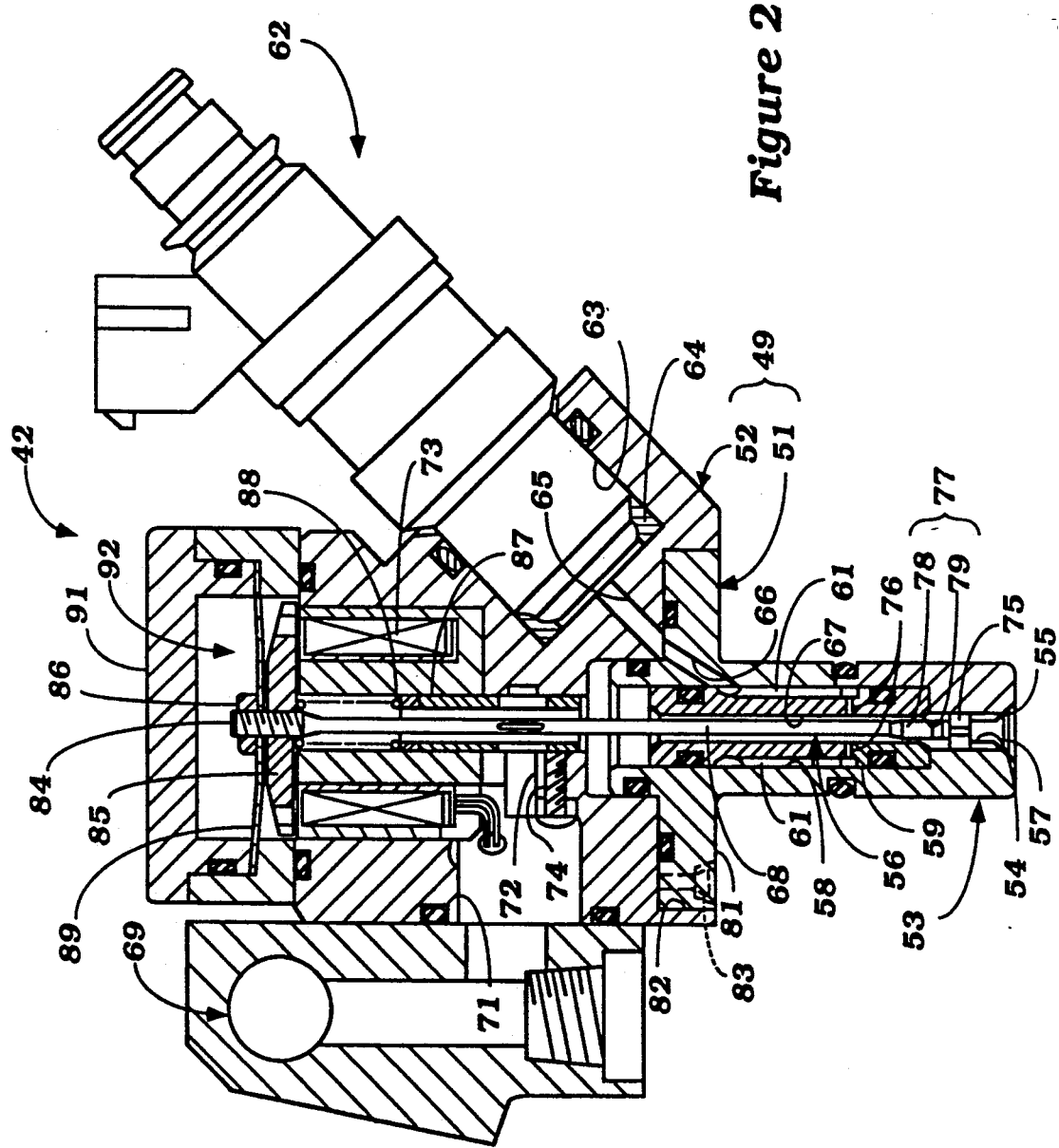
FIG. 2 is an enlarged cross sectional view taken through the fuel air injector of an embodiment of the invention.

Referring now in detail to FIG. 2, the air/fuel injector 42 is comprised of an outer housing assembly 49 made up of primarily a lower housing piece 51 and an upper housing piece 52 which are connected to each other in a manner to be described. The lower housing piece 51 has a cylindrical pilot portion 53 that is adapted to be inserted into a suitable bore in the cylinder head 38 and affixed thereto in a suitable manner. A nozzle port 54 is formed at the lower end of the pilot portion 53 and terminates in a valve seat 55. An injection valve member, indicated generally by the reference numeral 56 has a head portion 57 that cooperates with the valve seat 55 to selectively open and close the nozzle port 54 for communication with the combustion chamber.

The nozzle port 54 terminates at its upper end in a counter bore 58 formed in the lower piece 51. An insert 59 is received within the bore 58 and defines a first chamber 61 around the outer periphery of the insert piece 59. The chamber 61 is a fuel chamber and is adapted to receive fuel that is sprayed by a fuel injector 62 that is mounted within a recess 63 of the upper housing piece 52. A seal 64 is formed at the lower end of this recess 63 and provides a seal around the lower end of this injector 62. The fuel injector 62, when actuated, sprays fuel through a fuel delivery port 65 formed in the upper housing piece 52 and which communicates with a further fuel delivery port 66 in the lower housing piece 51 which, in turn, communicates with the fuel chamber 61.

The insert 59 is formed with an internal bore 67 through which a stem 68 of the injector valve 56 passes. This forms a further chamber to which compressed air is delivered by a manifold 69 which, in turn, communicates with an air compressor (not shown). The manifold 69 has delivery ports 71 that communicate with delivery ports 72 formed in the upper housing piece 52 and which, in turn, communicate with the chamber formed by the bore 67 through passageways formed in an insert sleeve 73 which is held in place by a set screw 74.

The injector valve 56 has a plurality of projections 75 which engage the nozzle port 54 so as to provide sliding support for the injector valve 56 while, at the same time, permitting flow therepast. The fuel chamber 61 communicates with the chamber formed by the insert bore 67 through a plurality of radially extending fuel delivery passages 76.

The area between the chamber formed by the bore 67 of the insert 59 and the fuel chamber 66 is isolated from the area between the valve head 57 and valve seat 55 by means of an orifice, indicated generally by the reference numeral 77 which is formed by an enlargement 78 of the valve stem 68 and a restriction 79 formed at the lower end of the insert piece 56. This orifice 77 tends to isolate the aforenoted chambers from the pressure in the combustion chamber so as to provide better fuel/air injection control.

The lower housing piece 51 is formed within an enlarged cylindrical portion 81 that is received within a bore 82 formed at the lower end of the upper housing piece 52. A plurality of socket headed screws 83 fix the lower and upper pieces 51 and 52 together.

The upper end of the injector valve stem 68 has a threaded portion 84 onto which is fixed an armature 85. The armature 85 is held in place by a locknut 86. The armature 85 cooperates with a solenoid winding 87 which is energized in response to a signal from the ECU 45 so as to draw the armature 85 downwardly against the action of a coil spring 88 and open the injector valve 56 so that the head 57 moves away from the valve seat 55 and fuel and air can be delivered into the combustion chamber. When the solenoid 87 is deenergized, the coil spring 88 will urge the injector 56 back to its closed position.

A diaphragm 89 is affixed between the locknut 86 and the armature 85 and provides a seal for the upper housing assembly through cooperation with a cap 91 so as to define a solenoid chamber 92 in which the armature 85 and solenoid winding 73 are contained.

Fuel is supplied to the fuel injector 62 by a suitable manner and the fuel injector 62 is, in the illustrated embodiment, of the electrically operated type. Referring again to FIG. 1, the ECU puts out a solenoid control signal b that selectively energizes the solenoid winding 73 for opening the injector valve 56 and a fuel control signal c to the fuel injector 62 so as to control the timing and duration of fuel injection.

Figure 3:
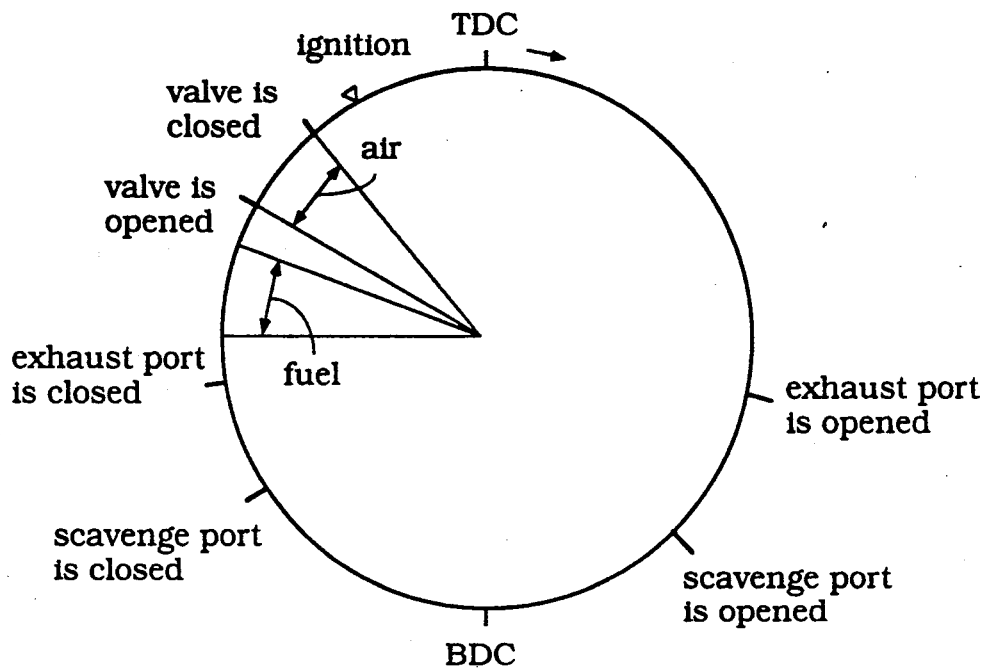
FIG. 3 is a graphical timing view showing how the fuel and air are supplied to the fuel air injector of a prior art type of construction under low load, low speed conditions.
Figure 4:
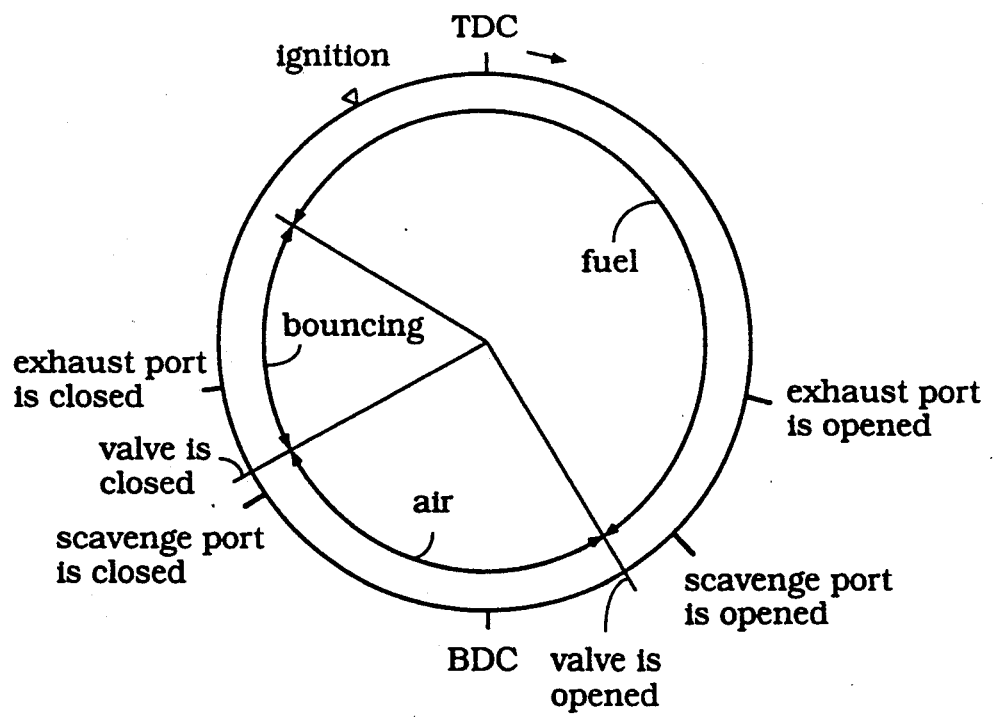
FIG. 4 is a timing chart, and similar to FIG. 3, and shows the way the fuel and air is supplied to a prior art type of construction under high speed, high load conditions.

In accordance with a type of previously proposed control strategy, called a pre-charged type, fuel is injected by the injector 62 into the fuel chamber 61 during the time period when the injector valve 56 is closed. FIGS. 3 and 4 are timing curves of this type of prior art construction showing low speed, low load and high speed, high load conditions, respectively. In these curves the timing events of the opening and closing of the exhaust port 47 and the opening and closing of the scavenge ports 41 is depicted in relation to top and bottom dead center as is the time of ignition caused by firing of the spark plug 43.

As may be seen in FIG. 3, under low load, low speed conditions, the fuel injector 62 is operated by commencing injection at some time after the closing of the exhaust port and concluding it before the injector 56 is opened. The injector valve 56 is then opened and closed for a time period which precedes the timing of firing of the spark plug 49.

Under high speed, high load conditions, the timing of fuel injection by operation of the injector 62 is advanced and extended so that fuel injection begins at some point time after the exhaust port closes from the previous cycle and before ignition has occurred. The timing of fuel injection is stopped at approximately the same time when the injector valve 66 is opened, at some time after the scavenge ports 41 open. Injection continues until some time after the scavenge port closes as shown in FIG. 4. The problem with this type of construction, however, is that the bouncing of the injector valve 56, which is almost inherent in these constructions, causes continuing injection of fuel and air even after the valve is initially closed by denergization of the solenoid 73 so that some fuel will be injected before the exhaust port closes and poor fuel economy and high emission hydrocarbons can result. In addition, it is difficult to provide full fuel charging and also insure that all of the fuel will be discharged from the fuel injector under these conditions.

In accordance with the invention, therefore, a control strategy is employed, as will be described in conjunction with FIGS. 5 through 8, wherein under low speed, low load conditions, fuel is injected by the injector 62 at the time when the injector valve 56 is opened. As the load and speed on the engine increase, the timing of opening of the injector valve 56 is advanced until a fixed point of advance is reached and then under further increasing loads, the timing of opening of the injector valve 56 is held constant and the timing of beginning of fuel injection by the fuel injector 62 is continued to advance. In this way, there is some pre-charging but the main portion of the fuel is still delivered when the injector valve 56 is opened so that it will be insured that all of the fuel will be discharged from the injector valve housing 49 and specifically the chamber 61 and the chamber formed by the insert piece bore 67 during each cycle.

Figure 5:
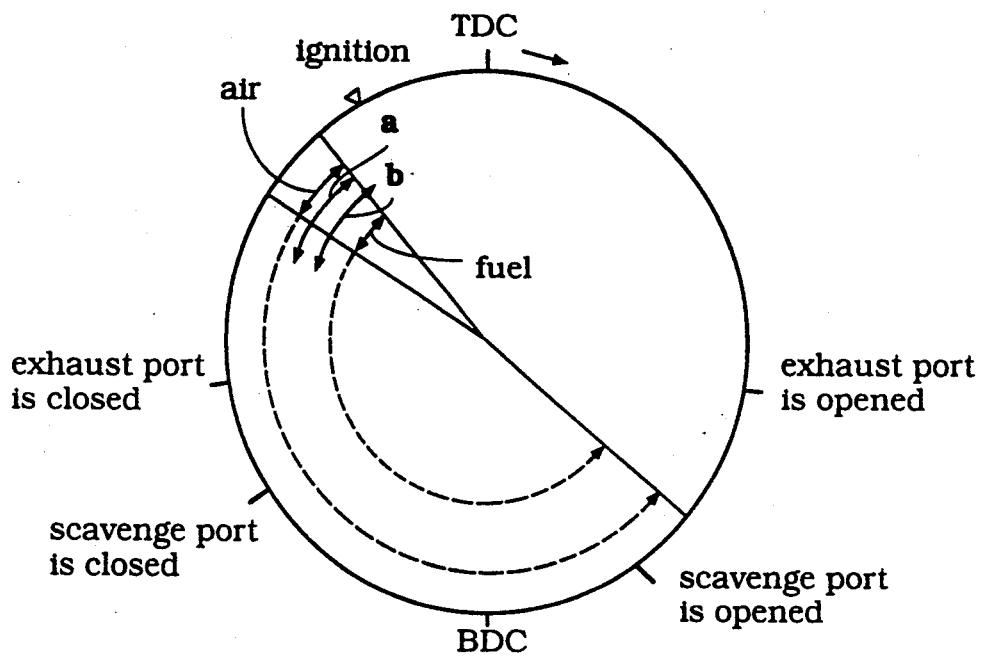
FIG. 5 is a graphical timing chart showing the fuel/air control in accordance with an embodiment of the invention under low speed conditions.

Referring first to FIG. 5, the solid curves of this timing diagram show the operation under low speed, low load. It will be seen that the fuel/air injector valve 56 is opened at a timed duration which is equal to the time duration of injection of fuel from the fuel injector 62. Hence, this timing relationship is of the conventional non pre-charged type. It should be noted that the timing of fuel injection by the injector 62 and opening and closing of the injector valve 56 need not be coincident. For example, the injector valve 56 may be opened slightly before fuel injection is commenced from the injector 62 and closed at the same time fuel injection is terminated as indicated by the solid curve a or, alternatively, the injector valve 56 may be opened before fuel injection by the injector 62 is started and closed after fuel injection by the injector 62 is stopped as shown by the curve b.

Figure 6:
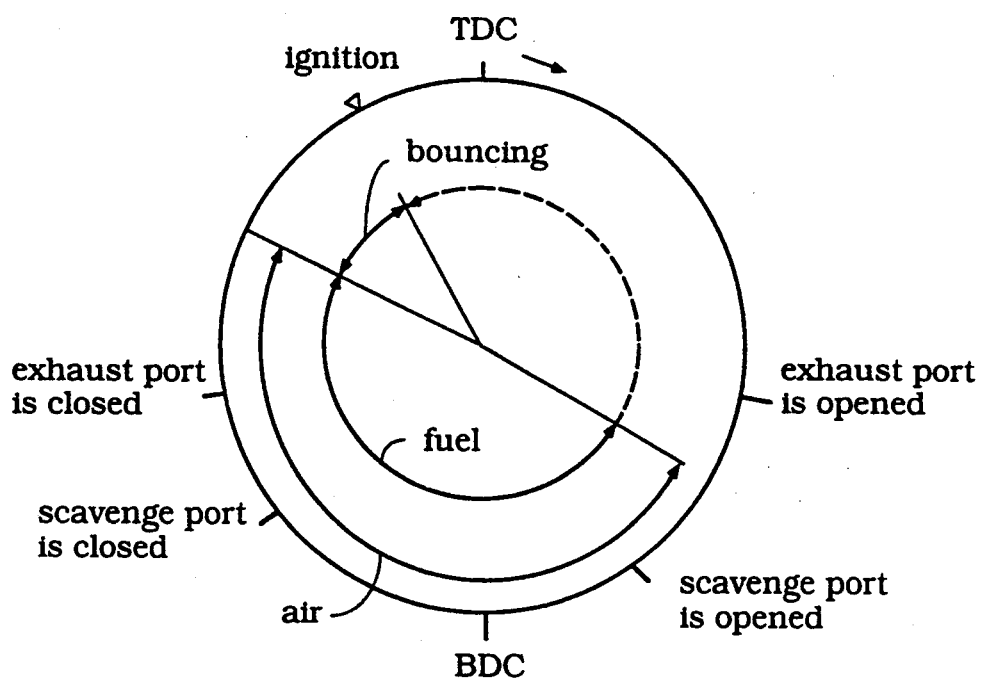
FIG. 6 is a graphical view showing the timing chart of the fuel/air injection in accordance with an embodiment of the invention under high speed, high load conditions.
Figure 7:
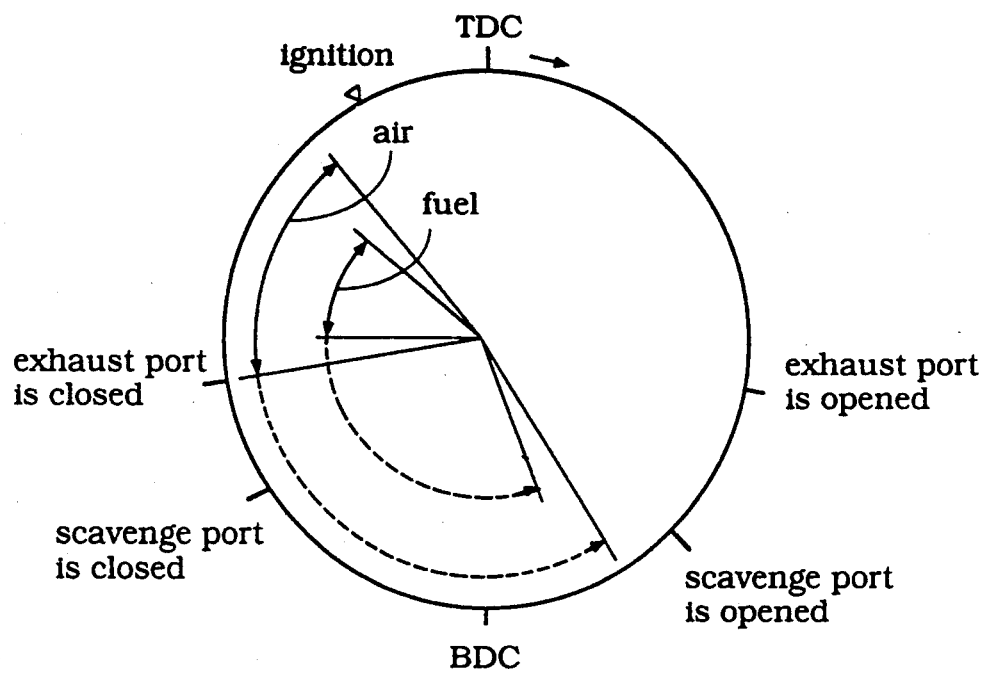
FIG. 7 is a graphical view of a timing chart showing how the fuel/air control is varied in accordance with embodiments of the invention.
Figure 8:
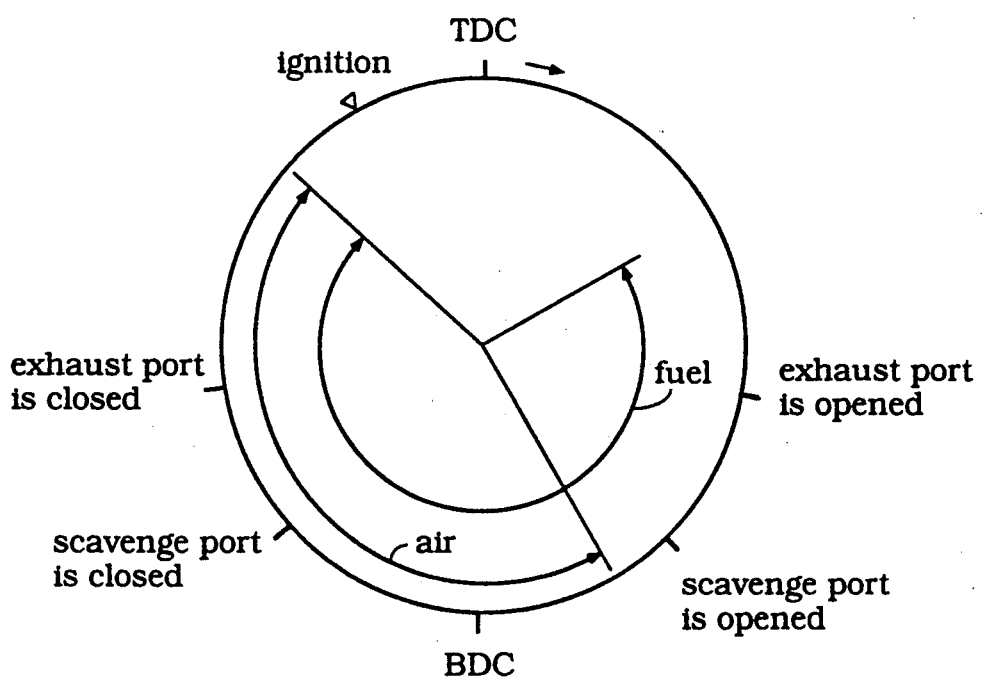
FIG. 8 is a timing chart showing the fuel/air control under high speed, high load conditions in accordance with the invention.

As the engine speed and load increases during this low speed first phase of operation, the timing of opening of the injection valve 56 is advanced as is the timing of injection of fuel from the injector 62 so as to maintain the same relationship as afore described wherein fuel injection and opening of the injector valve 62 are substantially coincident (FIG. 7). This condition is maintained up through the mid-range performance of the engine (FIG. 6). That is mid-range load and speed conditions. However, at a given point on the curve of load and speed, as will be described by reference to FIGS. 9 and 10, the timing of the advance of the opening of the injector valve 56 is stopped. Then as the load of the engine increases, further fuel is supplied by beginning to inject fuel from the injector 62 before the injector valve 56 is opened. This condition is shown in FIG. 6 by the broken line view and in FIG. 8. It will be noted that the injector valve 56 may be opened initially at a point in time just slightly before the scavenge port is opened but always after the time when the exhaust port is opened. In a preferred embodiment, the amount of fuel injected into the fuel cavity 61 of the fuel/air injector 42 before the injector valve 56 is opened never exceeds 36 per cent of the total amount of fuel required. That is, the majority of the fuel is still injected during the time when the injector valve 56 is opened. This will insure good purging of the fuel from the injector 46 during each cycle of its injection.

Figure 9:
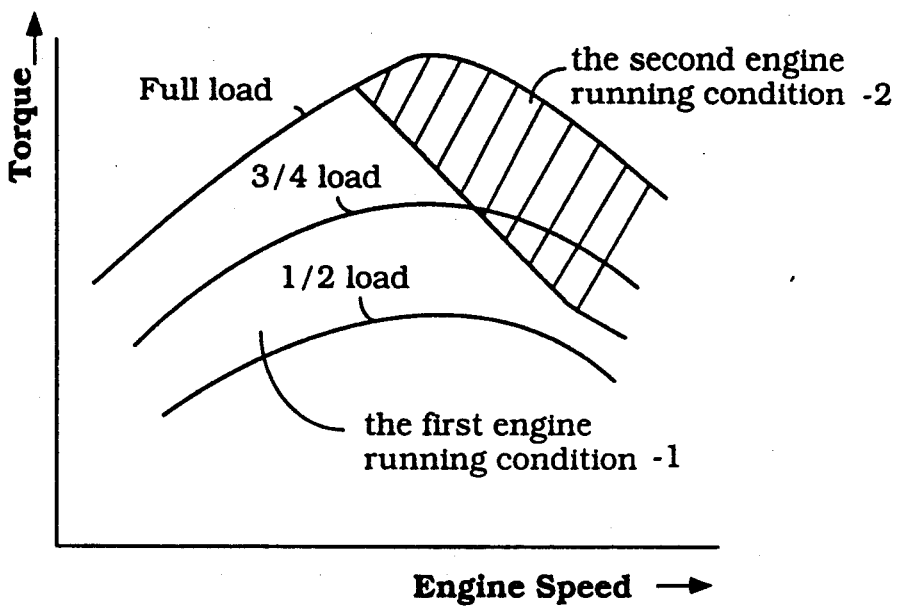
FIG. 9 is a family of curves of torque and engine speed showing the conditions under which the fuel/air control is varied in accordance with an embodiment of the invention.
Figure 10:
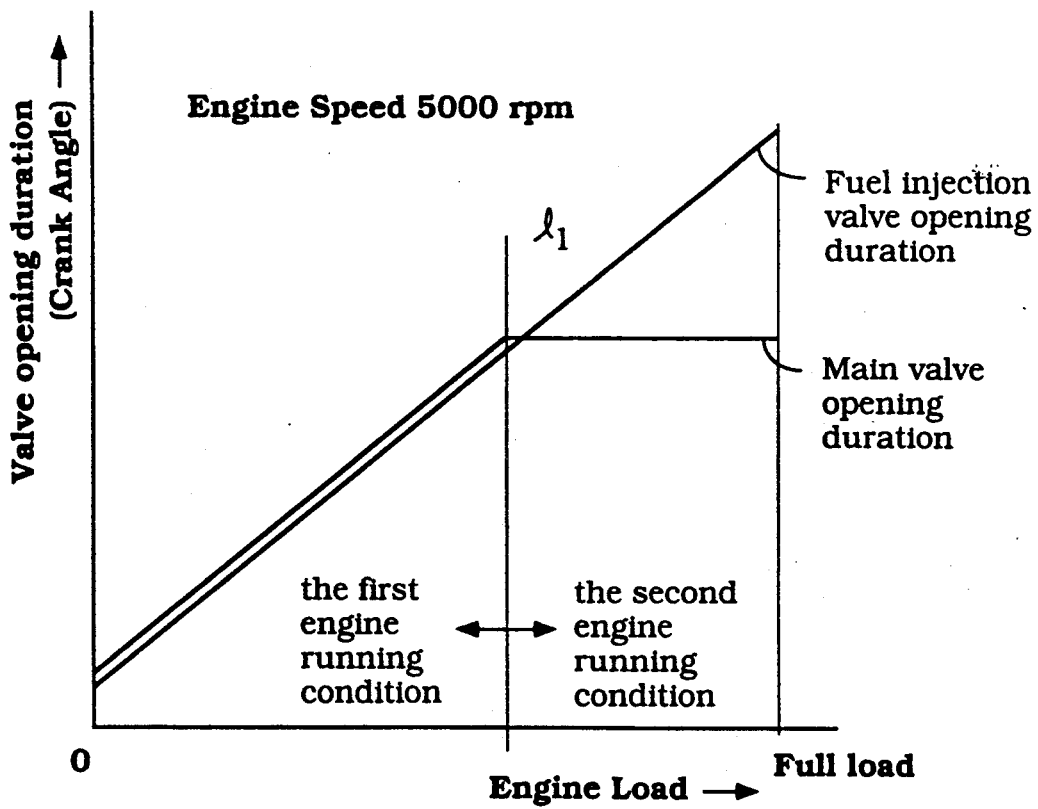
FIG. 10 is a graphical view showing the fuel injection valve timing events in response to varying engine load conditions.

Referring now to FIGS. 9 and 10 and initially to FIG. 9, this is a family of curves showing the torque curve at wide open throttle under varying load conditions. The portion of the curve under the shaded portion indicated as the area 1 is the first running condition of the engine and the time when no fuel is injected by the injector 62 before the injector valve 56 is opened. The shaded line portion of the curve shown by the area 2 is the second running condition, that is the time when fuel injection by the injector 62 is advanced so that fuel will be injected before the fuel injector 56 is opened.

FIG. 10 is a graphical view showing the timing of engine load versus valve opening duration in terms of crank angle. During the first running condition up till the vertical line l₁, the fuel and air injection is advanced both in timing and duration but the fuel injection never occurs before the injector valve 56 is opened. However, when the second running condition is reached, the injector valve opening is held at a fixed crank angle and the fuel injection valve opening is advanced until full load conditions are reached.

It will be noted that because of the described relationship if any bouncing of the injector valve occurs, this bouncing will not cause any additional fuel to be delivered to the combustion chamber since all of the fuel will have been depleted from the fuel and air injector 42 by the time the injector valve 56 is closed. As a result, the bouncing will have no detrimental effect on combustion such as causing misfiring, pre-ignition or the like as with the prior art constructions.

With the strategies as thus far described it will be apparent that the efficiency of the fuel/air injector is good under all running conditions and also the detrimental effects of the prior art type of constructions are avoided. However, with this control strategy there may be a time when the fuel requirements of the engine are such that they cannot be fully supplied by the afore described strategy wherein it is desired to insure that too much fuel is not injected by the injector 62 into the injection chamber 61 before the injector valve 56 is opened. To overcome these problems, a sub or auxiliary fuel injector may be employed for supplying the additional fuel under these extreme conditions. The sub or auxiliary fuel injector may inject fuel either into the intake manifold 35, the crankcase chambers 31, scavenge passages 39 or combustion chamber 36 directly. This sub or auxiliary injector may be either a pure fuel injector or a fuel/air injector. If the fuel is injected into the crankcase chamber 31 or upstream of it, it will provide added cooling under these high load conditions.

Figure 11:
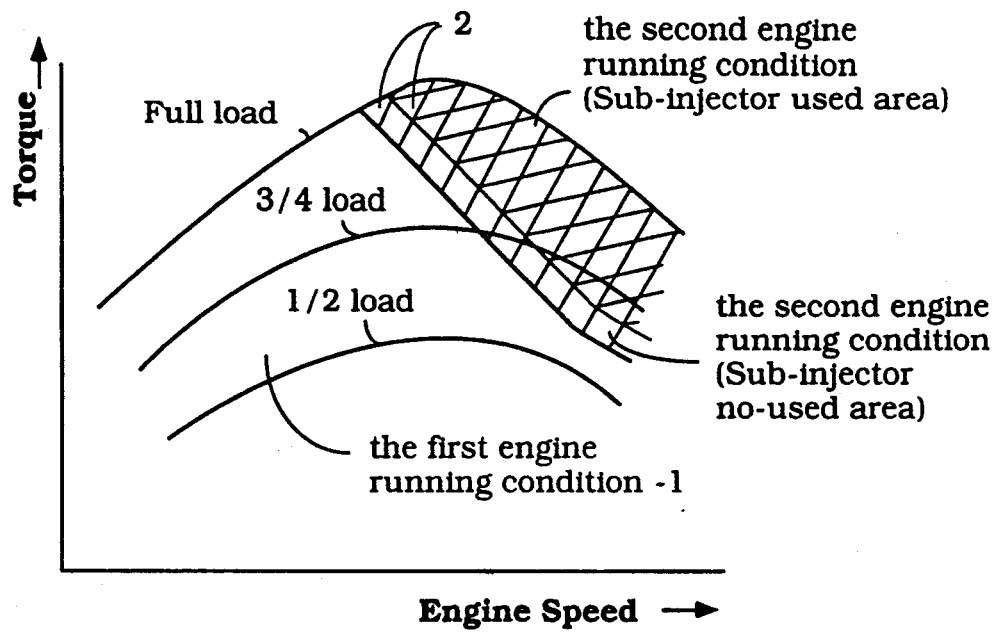
FIG. 11 is a graphical view, in part similar to FIG. 9, showing another embodiment of the invention wherein a sub-fuel injector may also be employed.
Figure 12:
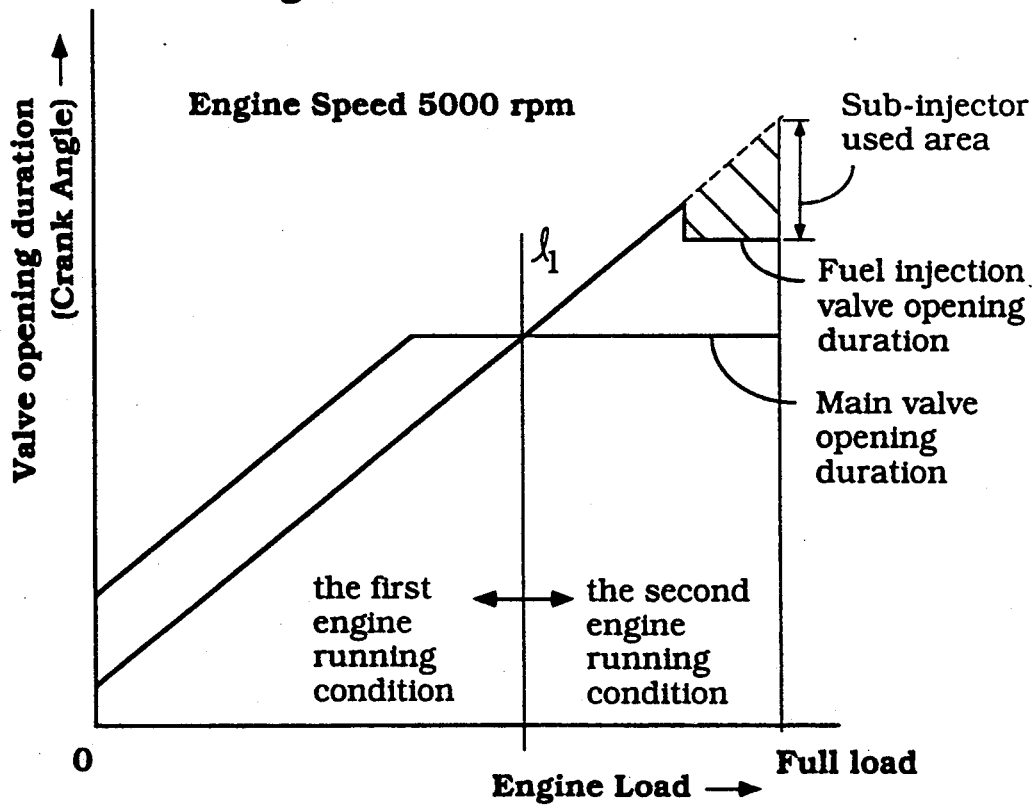
FIG. 12 is a graphical view, in part similar to FIG. 10, showing the timing events when the sub-fuel injector is employed.

FIGS. 11 and 12 show such an embodiment. FIGS. 11 and 12 correspond to FIGS. 9 and 10 and show the range when no fuel is injected by the sub-injector and when fuel is injected by the sub-injector. It should be noted that the strategy as described causes the fuel injector valve 56 to open before the fuel injector 62 is energized during the first running condition and then the timing of the main injection valve opening is held constant and at a given point in time the fuel injector 62 will begin to inject fuel before the main injection valve 56 is opened. However, at the time when the sub-injector begins to inject fuel, the beginning of injection by the fuel injector 62 may be retarded slightly and then held constant with the additional fuel requirements being provided solely by the auxiliary or sub-fuel injector.

It should be readily apparent from the foregoing description that the described embodiments are very effective in providing good dynamic range of operation of the air/fuel injector, good fuel atomization and good fuel disbursement without causing problems of misfiring or pre-ignition even in the extreme event when the injector valve 56 may bounce. It should also be readily apparent that the foregoing description is that of preferred embodiments of the invention and various changes and modifications may be made without departing from the spirit and scope of the invention, as defined by the appended claims.

We claim:

1. A fuel/air injector unit comprising an outer housing assembly defining chamber means, air means for supplying air under pressure to said chamber means, fuel means for supplying fuel to said chamber means, an injector port communicating said chamber means with an engine chamber, an injector valve for opening and closing said injector port, sensor means for sensing engine running conditions and control means for controlling fuel delivery by said fuel means to said chamber means and opening and closing of said injector valve in response to sensed engine conditions for varying at least the opening of said injector valve at certain sensed engine conditions, holding the time of opening of said injector valve constant in at least a range of sensed conditions, varying at least the initiation of fuel delivery by said fuel means at certain sensed running conditions, and initiating the fuel delivery of said fuel means beginning at a time before said injector valve is opened and terminating at a time after said injector valve is opened under at least one running condition of said engine.

2. A fuel/air injector as set forth in claim 1 wherein the duration of fuel injection is increased as the load of the engine increases during the one running condition of the engine.

3. A fuel/air injector as set forth in claim 1 wherein there is a second running condition of the engine wherein the control means effects initiation of fuel delivery by the fuel means at a time which does not precede the opening of the injector valve.

4. A fuel/air injector as set forth in claim 3 wherein the duration of duel injection is increased as the load of the engine increases during the one running condition of the engine.

5. A fuel/air injector as set forth in claim 1 further including further fuel supply means for supplying additional fuel to the engine as the load of the engine increases during the one running condition.

6. A fuel/air injector as set forth in claim 1 wherein the fuel/air injector unit delivers fuel directly to the combustion chamber of the engine.

7. A fuel/air injector as set forth in claim 6 wherein the duration of fuel injection is increased as the load of the engine increases during the one running condition of the engine.

8. A fuel/air injector as set forth in claim 6 wherein there is a second running condition of the engine wherein the control means effects initiation of fuel delivery by the fuel means at a time which does not precede the opening of the injector valve.

9. A fuel/air injector as set forth in claim 8 wherein the duration of fuel injection is increased as the load of the engine increases during the one running condition of the engine.

10. A fuel/air injector as set forth in claim 6 wherein the engine is two-cycle crankcase compression engine and has scavenge port means for delivering a charge to the combustion chamber from a crankcase chamber and exhaust port means for discharging a burnt charge from the combustion chamber to the atmosphere.

11. A fuel/air injector as set forth in claim 10 wherein the duration of fuel injection is increased as the load of the engine increases during the one running condition of the engine.

12. A fuel/air injector as set forth in claim 10 wherein there is a second running condition of the engine wherein the control means effects initiation of fuel delivery by the fuel means at a time which does not precede the opening of the injector valve.

13. A fuel/air injector as set forth in claim 12 wherein the duration of fuel injection is increased as the load of the engine increases during the one running condition of the engine.

14. A fuel/air injector as set forth in claim 10 wherein the timing of the opening of the injector valve is after the timing at which the scavenge port is opened.

15. A fuel/air injector as set forth in claim 14 wherein the duration of fuel injection is increased as the load of the engine increases during the one running condition of the engine.

16. A fuel air injector as set forth in claim 14 wherein there is a second running condition of the engine wherein the control means effects initiation of fuel delivery by the fuel means at a time which does not precede the opening of the injector valve.

17. A fuel/air injector as set forth in claim 16 wherein the duration of fuel injection is increased as the load of the engine increases during the one running condition of the engine.

18. A fuel/air injector as set forth in claim 1 wherein less fuel is injected by the fuel means before the injector valve is opened than after the injector valve is opened during the one running condition.

19. A method of operating a fuel/air injector unit comprising an outer housing assembly defining chamber means, air means for supplying air under pressure to said chamber means, fuel means for supplying fuel to said chamber means, an injector port communicating said chamber means with an engine chamber, an injector valve for opening and closing said injector port, sensor means for sensing engine running conditions, said method comprising the steps of varying at least the opening of said injector valve at certain sensed engine conditions, holding the time of opening of said injector valve constant in at least a range of sensed conditions, varying at least the initiation of fuel delivery by said fuel means at certain sensed running conditions, and initiating the fuel delivery of said fuel means beginning at a time before said injector valve is opened and terminating at a time after said injector valve is opened under at least one running condition of said engine.

20. A method of operating a fuel air injector as set forth in claim 19 wherein the duration of fuel injection is increased as the load of the engine increases during the one running condition of the engine.

21. A method of operating a fuel/air injector as set forth in claim 19 wherein there is a second running condition of the engine and initiation of fuel delivery by the fuel means is begun at a time which does not precede the opening of the injector valve during the second running condition.

22. A method of operating a fuel/air injector as set forth in claim 21 wherein the duration of fuel injection is increased as the load of the engine increases during the one running condition of the engine.

23. A method of operating a fuel/air injector as set forth in claim 19 further including the step of supplying additional fuel to the engine as the load of the engine increases during the one running condition by a source other than the fuel/air injector.

24. A method of operating a fuel/air injector as set forth in claim 19 wherein the fuel/air injector unit delivers fuel directly to the combustion chamber of the engine.

25. A method of operating a fuel/air injector as set forth in claim 24 wherein the duration of fuel injection is increased as the load of the engine increases during the one running condition of the engine.

26. A method of operating a fuel/air injector as set forth in claim 24 wherein there is a second running condition of the engine and initiation of fuel delivery by the fuel means is begun at a time which does not precede the opening of the injector valve during the second running condition.

27. A method of operating a fuel/air injector as set forth in claim 26 wherein the duration of fuel injection is increased as the load of the engine increases during the one running condition of the engine.

28. A method of operating a fuel/air injector as set forth in claim 19 wherein the engine is two-cycle crankcase compression engine and has scavenge port means for delivering a charge to the combustion chamber from a crankcase chamber and exhaust port means for discharging a burnt charge from the combustion chamber to the atmosphere.

29. A method of operating a fuel/air injector as set forth in claim 28 wherein the duration of fuel injection is increased as the load of the engine increases during the one running condition of the engine.

30. A method of operating a fuel/air injector as set forth in claim 29 wherein the timing of opening of the injector valve is held constant after the timing of the delivery of fuel from the fuel means is advanced.

31. A method of operating a fuel/air injector as set forth in claim 28 wherein there is a second running condition of the engine and initiation of fuel delivery by the fuel means begins at a time which does not precede the opening of the injector valve during the second running condition.

32. A method of operating a fuel/air injector as set forth in claim 31 wherein the duration of fuel injection is increased as the load of the engine increases during the one running condition of the engine.

33. A method of operating a fuel/air injector as set forth in claim 28 wherein the timing of the opening of the injector valve is after the timing at which the scavenge port is opened.

34. A method of operating a fuel/air injector as set forth in claim 33 wherein the duration of fuel injection is increased as the load of the engine increases during the one running condition of the engine.

35. A method of operating a fuel/air injector as set forth in claim 33 wherein there is a second running condition of the engine and initiation of fuel delivery by the fuel means begins at a time which does not precede the opening of the injector valve during the second running condition.

36. A method of operating a fuel/air injector as set forth in claim 35 wherein the duration of fuel injection is increased as the load of the engine increases during the one running condition of the engine.

37. A method of operating a fuel/air injector as set forth in claim 19 wherein less fuel is injected by the fuel means before the injector valve is opened than after the injector valve is opened during the one running condition.

* * * * *